United States Patent Office 2,848,421
Patented Aug. 19, 1958

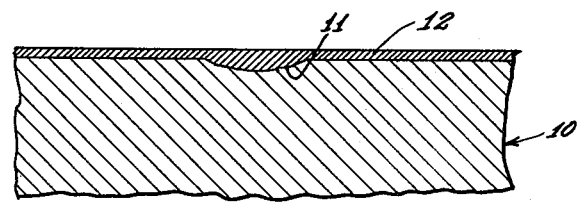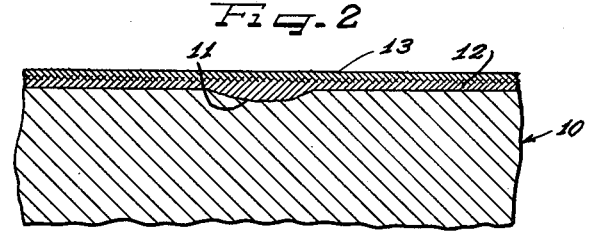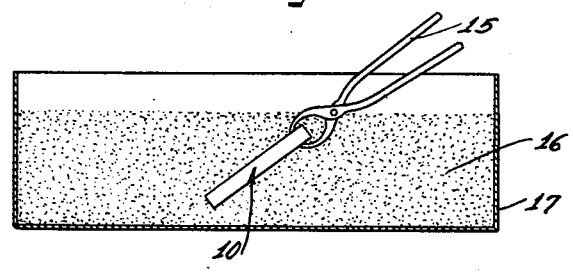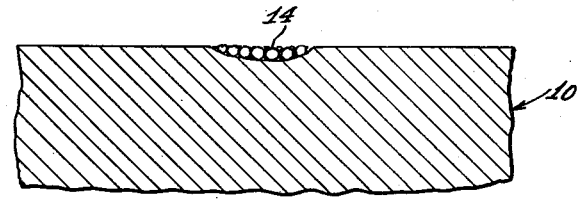

2,848,421

INDICATING POWDER COMPOSITION

Taber De Forest, Northbrook, Ill., assignor to Magnaflux Corporation, Chicago, Ill., a corporation of Delaware Application October 28, 1954, Serial No. 465,405

5 Claims. (Cl. 252—408)

This invention relates to a composition particularly useful for detecting surface discontinuities. It relates more particularly to a composition useful in a non-destructive method for testing articles wherein a liquid penetrant, used in conjunction with a visible pigment material is applied to the surface of a test piece so that the visible or fluorescent indicating material becomes deposited in the surface defects, thereby indicating the existence and location of such defects.

One of the most widely used methods for detecting surface discontinuities in test samples has been described in Ward Patent No. 2,405,078. This patent describes a process in which a water emulsifiable penetrant containing an indicating composition is applied to the surface of the test samples, and the excess penetrant is washed off the surfaces of the samples by means of water.

While the method described in that patent is more than adequate for the usual inspection, it has been found of the penetrant from very shallow or wide surface detecting very fine surface flaws, cracks, and the like. It appears that the inclusion of the emulsifying agent in the penetrant composition tends to cause washing away of the penetrant from very shallow or side surface defects, resulting in these defects being overlooked on the subsequent inspection of the treated surface.

There have been several suggested improvements for the process described in the aforementioned Ward patent. For example, in my U. S. application Serial No. 114,723, now U. S. Patent No. 2,707,236, there is described a method for detecting surface flaws which consists in applying a liquid such as a mineral oil to the surface of the test articles and then wiping off all of the applied liquid, except that which remains lodged in the surface discontinuities. Next, a finely divided indicating powder is applied to the surface by dusting or by suspending the powder in an air stream. Preferably, this powder takes the form of a mixture of a suitable carrier and a pigment, the pigment particles having the ability to separate themselves from the carrier particles and adhere to the liquid remaining in the surface cracks or flaws. The next step consists in removing any loosely adhering powder from the surface and leaving the pigment particles adhering to the liquid penetrant in the flaw. Finally, the article is inspected under ordinary light or under ultra-violet light to detect those portions of the test piece in which the pigment particles have become lodged.

In a further improved modification of this process, the present applicant and Donald W. Parker in their U. S. application Serial No. 445,496 have described a process in which a non-water miscible penetrant is employed. This penetrant is applied to the test piece so that the indicating material is capable of becoming deposited along the surface of any flaws or cracks which may be present. Subsequently, an emulsifier layer is applied over the film of liquid penetrant for a sufficient time to permit the emulsifier to penetrate into the film of penetrant and render the treated portion water washable. The emulsifier does not, however, have an opportunity to penetrate into the portion of the penetrant solution which has accumulated in the surface defects. The emulsified portion of the applied liquid is then washed off with water, and the surface is dried. Finally, the dried surface is treated with a developer which has the ability of adhering to the penetrant liquid still remaining in the surface flaws and making such flaws more visible under the particular light source being employed for inspection.

Both of the above described processes, and others which utilize liquid penetrants to penetrate into surface discontinuities and indicating powders to develop the visible contrast between the penetrant in such discontinuities and surrounding surface of the test piece, require the use of freely flowable powder compositions which are capable of readily absorbing the liquid penetrant present in the surface discontinuity and of producing an indication of the discontinuity that is more easily detected by visual inspection. The provision of an improved composition meeting these requirements is the principal object of the present invention.

Another object of the invention is to provide an improved indicating composition including a carrier and pigment particles carried thereby, the composition having mobility which far exceeds the normal mobility of finely divided pigment particles.

Another object of the invention is to provide an improved, freely flowable indicating composition which includes as a carrier, a silica aerogel which has the ability of carrying finely divided pigment particles into the surface discontinuities but still is capable of being readily removed from the portions of the article on which no discontinuities occur.

Another object of the invention is to provide an indicating powder composition which has an extremely low density and has many of the characteristics of a liquid, so that the test piece can be treated with the powder composition by simple immersion therein.

Other and further objects and features of the present invention will be more apparent from the following description and the appended claims.

In the drawings:

The drawings illustrate a particularly preferred embodiment of the invention in which—

Figure 1 is a greatly enlarged cross-sectional fragmentary view of a test piece containing a flaw, after being coated with a film of liquid penetrant;

Figure 2 is a view similar to Figure 1, but illustrating the succeeding step in which the penetrant film has been covered with an emulsifier film;

Figure 3 is a cross-sectional view of the test piece being immersed in the carrier powder composition; and Figure 4 is a view similar to Figures 1 and 2, illustrating the condition of the test piece in which the excess penetrant solution has been removed and the dry developer powder of the present invention has been applied to the test piece.

As shown in the drawings:

The process illustrated in the appended drawings represents the preferred embodiment of the present invention, and employs the type of treatment described in the aforementioned application of the present applicant and Donald W. Parker, Serial No. 445,496. As illustrated in Figure 1, reference numeral 10 indicates generally the test piece, which may be metallic, non-metallic, magnetic, or non-magnetic, as long as it has a relatively liquid impermeable surface. For purposes of illustration, the test piece 10 is illustrated as having a relatively shallow flaw or discontinuity 11 in its outer surface. It will be clear from the showing in Figure 1, that the size of the discontinuity 11 is greatly exaggerated in order to illustrate the condition more clearly.

In carrying out the process of the present invention, the test piece 10 is cleaned and dried, and is then coated with a film 12 of a water immiscible liquid penetrant. The latter may be applied by dipping the test piece 10 into a bath of the penetrant, or the penetrant can be poured or sprayed over the surface of the test piece 10.

Numerous compositions of penetrant may be employed, and reference is made to the aforementioned application Serial No. 445,496 for suitable examples. As mentioned in that application, a suitable penetrant may include a mixture of 40% by volume of refined kerosene, about 45% by volume of a lubricating oil, and 15% of a dye solvent such as an alkylaryl phosphate which is soluble in the petroleum oil.

The penetrant may also include any suitable type of dye material, particularly if the indicating powder does not provide a natural contrast to the surface of the test piece. Thus, the dye may be fluorescent or not, but is preferably colored. A suitable fluorescent dye is the type known commercially as Fluorol 7GA sold under that name by General Dyestuffs Corp. In general, these fluorescent type of dyes are preferred since they can be rendered more strongly visible by inspection under-ultra-violet light. As a specific example, to the penetrant vehicle mentioned previously, I may add about 0.35 gram of Fluorol 7GA and 0.25 gram of 4-methyl-7-diethylamino coumarin per 100 ml. of vehicle to provide a fluorescent penetrant particularly adapted for use with white or colorless indicator particles.

As an example of a non-fluorescent penetrant composition, I may employ a vehicle consisting of about 75% by volume of naphtha, and 25% by volume of partially hydrogenated terphenyl. For 100 milliliters of this vehicle, there is added about 3 grams of No. 322 Mefford oil red dye, a dye which is soluble in the oil vehicle.

In choosing a penetrant composition, it is desirable to provide a composition with good wetting properties toward the surface of the test piece and one which has a relatively low vapor pressure at the operating temperature, a high flash point, and a lack of toxicity.

After application of the penetrant film 12, the surface of the article is treated so as to remove excess penetrant solution, leaving only that portion of the solution which is trapped within the discontinuity 11. For this purpose, a particularly suitable emulsifier composition is one containing about 23% by volume kerosene, 55% by volume of refined tall oil, and about 22% by volume triethanolamine. The viscosity of the liquid emulsifier can be varied considerably. Where maximum sensitivity is desired only in the case of extremely fine cracks, and cost is an important factor, emulsifiers having a viscosity as low as 50 centistokes at the operating temperature can be used. On the other hand, highly viscous materials having viscosities up to 1250 centistokes or even higher may be employed.

The emulsifier is applied as a film 13 over the penetrant film 12, and is permitted to diffuse into the penetrant film 12 for such time, as indicated by experience, as may be required for the portions of the penetrant film 12 surrounding the discontinuity 11 to become water solubilized. When this time has elapsed, the test piece is subjected to the action of a stream or spray of water for a sufficient time to wash away the now emulsified penetrant film, leaving the non-emulsified penetrant still trapped within the discontinuity 11.

Next, the dry developer or indicator powder is applied. In order to achieve the best results, the powder must be mobile in the sense that it must be freely flowable along the exposed surfaces of the test piece. Preferably, it contains a pigment, either colored or colorless, which exerts by capillarity or other phenomenon an absorptive action toward the liquid contained in the surface discontinuity. These requirements are remarkably well met by the use of carrier particles of a silica aerogel of the type marketed under the name "Santocel" by the Monsanto Chemical Company. Similar silica aerogels are sold commercially by the Davison Chemical Company, by the Dow-Corning Company, and by the Cabot Company by the latter under the name of "Cabosil."

In its finely divided form, the silica aerogel has an extremely low density and exhibits a very high oil absorptivity. This material is a white, uniform, impalpable, free flowing powder having a density of about 7.5 pounds per subic foot (centrifuged in toluol), a pH of 7.2, a purity of 99.5%, an oil absorption of 240 pounds of oil per 100 pounds of silica, and a surface area of 290 square meters per gram. In its normal agglomerated form, it has a particle size that will be retained on a 60-mesh (U. S. standard) screen. Its ultimate particle size is very much smaller, usually less than 10 microns.

The particles may be applied in the manner illustrated in Figure 3 of the drawings. As there shown, the test piece 10 may be held by a pair of tongs 15 and immersed into a loose bed 16 of the carrier-pigment mixture disposed in a vessel 17.

The agglomerates of the silica aerogel have the ability to hold the fine, dust-like particles of the pigment in suspension but readily release the pigment particles to the trapped penetrant solution. As examples of pigments which can be employed, there are the fluorescent pigments such as zinc sulphide, chrysene, 2,7-dimethyl coeroxen, perylene, and fluorescent emerald green. As examples of non-fluorescent materials, there may be employed metallic oxides, carbon black, cobalt blue, toluidine red, or green toner. The preferred pigments according to the present invention, however, are white particles of talc or precipitated chalk. For best results, the particle size of any of the pigments mentioned should be below about 10 microns in maximum dimension.

I have also found that for best results the proportion of the silica aerogel carrier and the pigment particles should be controlled within the ranges of 80 parts by weight of silica aerogel particles and 20 parts by weight of pigment particles to 20 parts by weight of silica aerogel particles and 80 parts by weight of the pigment particles. Particularly good results are obtained by employing a 50-50 mixture by weight of silica aerogel and talc particles.

The effectiveness of the powder composition produced is apparently due to the fact that the silica aerogel has a lesser attraction for the pigment particles than the liquid in the crack has for the pigment, so that the pigment particles are capable of detaching themselves from the larger silica aerogel particles and adhering to the penetrant. As a result, a deposit of pigment particles are built up at any discontinuity containing the liquid penetrant. In general, the deposit so formed, indicated by the reference numeral 14 in the drawings, will consist of a plurality of such particles. The carrier, however, consisting of the agglomerated silica particles normally has a particle size much larger than the width of the usual cracks and is therefore not held at the cracks but is swept off the surface with any excess of pigment by an air blast or other cleaning operation used, after having left some of the pigment particles at the cracks.

The talc particles in particular have the property of clinging or adhering to the surface of a test piece even though the surface may be quite dry, as is the case before the penetrant starts to bleed from the cracks. The silica particles, on the other hand, will cling only when moist. Due to its characteristics, talc will act as a complete developing agent on fine cracks, and will act as a wick to carry the liquid penetrant to the silica. The silica then picks up the penetrant from the talc "wick" and builds up a much heavier indication. In the case of large cracks, the silica can act by itself as a primary indicator. Also, due to its transparent nature, the silica gives brighter indications since ultra-violet light can penetrate through the silica and the visible light from the penetrant can similarly be transmitted through the silica particles.

Finally, the article thus treated is inspected either in ordinary light or under ultra-violet light or other exciting radiation. The location and extent of any surface defects, cracks or the like will thus be revealed.

From the foregoing, it will be apparent that the present invention provides an improved composition for the location of surface irregularities in test specimens. The composition of the present invention is well adapted for the testing of articles on an assembly line basis, in a continuous manner.

This application is a continuation-in-part of my co-pending application Serial No. 114,723 now U. S. Patent No. 2,707,236 entitled "Method of Detecting Flaws" filed September 9, 1949.

I claim as my invention:

1. A dry indicating powder composition comprising from 80 to 20 parts by weight of particles of a silica aerogel carrier and from 20 to 80 parts by weight of pigment particles having a particle size of less than about 10 microns and loosely adhering to and carried by said carrier.

2. A dry indicating powder composition comprising an intimate admixture of from 80 to 20 parts by weight of particles of a silica aerogel carrier and from 20 to 80 parts by weight of fluorescent pigment particles having a particle size of less than about 10 microns, loosely adhering to and carried by said carrier.

3. A dry indicating powder composition comprising an intimate admixture of from 80 to 20 parts by weight of particles of a silica aerogel carrier and from 20 to 80 parts by weight of colored pigment particles having a particle size of less than about 10 microns loosely adhering to and carried by said carrier.

4. A dry indicating powder composition comprising an intimate admixture of from 80 to 20 parts by weight of particles of a silica aerogel carrier and from about 20 to 80 parts by weight of a finely divided talc having a particle size of less than 10 microns loosely adhering to and carried by said carrier.

5. A dry indicating powder composition comprising an intimate admixture of from 80 to 20 parts by weight of particles of a silica aerogel carrier and from 20 to 80 parts by weight of finely divided precipitated chalk particles having a particle size of less than 10 microns loosely adhering to and carried by said carrier.

References Cited in the file of this patent

UNITED STATES PATENTS

| | | |
|---|---|---|
| 2,188,007 | Kistler | Jan. 23, 1940 |
| 2,259,400 | Switzer | Oct. 14, 1941 |
| 2,676,487 | Clarke | Apr. 27, 1954 |
| 2,737,460 | Werner | Mar. 6, 1956 |

FOREIGN PATENTS

| | | |
|---|---|---|
| 494,105 | Great Britain | Oct. 20, 1938 |
| 730,555 | Great Britain | May 25, 1955 |